(12) United States Patent
Tarantino et al.

(10) Patent No.: US 10,269,204 B2
(45) Date of Patent: Apr. 23, 2019

(54) METHOD FOR INDIVIDUALIZING A PORTABLE DATA CARRIER, IN PARTICULAR A CHIP CARD

(71) Applicant: GIESECKE+DEVRIENT MOBILE SECURITY GMBH, München (DE)

(72) Inventors: Thomas Tarantino, Laufen (DE); Sascha Behlendorf, Ebersberg (DE); Werner Strobl, München (DE); Rodrigue Gil, München (DE); Florian Gawlas, München (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 15/751,915

(22) PCT Filed: Aug. 9, 2016

(86) PCT No.: PCT/EP2016/001366
§ 371 (c)(1),
(2) Date: Feb. 12, 2018

(87) PCT Pub. No.: WO2017/025188
PCT Pub. Date: Feb. 16, 2017

(65) Prior Publication Data
US 2018/0232984 A1    Aug. 16, 2018

(30) Foreign Application Priority Data

Aug. 11, 2015 (DE) .......................... 10 2015 010 451

(51) Int. Cl.
*G06K 19/00* (2006.01)
*G07F 7/10* (2006.01)
(Continued)

(52) U.S. Cl.
CPC ............ *G07F 7/1008* (2013.01); *G06K 7/00* (2013.01); *G06K 19/0723* (2013.01);
(Continued)

(58) Field of Classification Search
USPC ......................... 235/435, 439, 454, 487, 492
See application file for complete search history.

(56) References Cited

U.S. PATENT DOCUMENTS 7,628,322 B2   12/2009   Holtmanns et al.
9,173,102 B2   10/2015   Summerer
(Continued)

FOREIGN PATENT DOCUMENTS

DE    102010054445 A1    6/2012
DE    102011015710 A1    10/2012
(Continued)

OTHER PUBLICATIONS

German Search Report from DE Application No. DE 10 2015 010 451.9, dated Jul. 22, 2016.
(Continued)

*Primary Examiner* — Matthew Mikels
(74) *Attorney, Agent, or Firm* — Workman Nydegger

(57) ABSTRACT

A method for individualizing a portable data carrier, in particular a chip card includes an end device that supplies data for configuring and/or updating one or more functions of the portable data carrier. The data are transmitted by the end device to the portable data carrier via a communication connection between the end device and the portable data carrier. A configurating and/or updating of the function or functions of the portable data carrier is effectuated by means of the data transmitted to the portable data carrier.

13 Claims, 1 Drawing Sheet

(51) Int. Cl.
  *G06K 7/00* (2006.01)
  *G06K 19/07* (2006.01)
  *G06K 19/077* (2006.01)
(52) U.S. Cl.
  CPC .. *G06K 19/07707* (2013.01); *G06K 19/07711* (2013.01); *G06K 2207/1017* (2013.01)

(56) References Cited

U.S. PATENT DOCUMENTS

| | | |
|---|---|---|
| 2009/0198605 A1 | 8/2009 | Ganzera et al. |
| 2014/0018041 A1 | 1/2014 | Summerer |
| 2015/0032635 A1* | 1/2015 | Guise .................. G06Q 20/356 705/72 |

FOREIGN PATENT DOCUMENTS

| | | |
|---|---|---|
| WO | 0143032 A1 | 6/2001 |
| WO | 2007003237 A1 | 1/2007 |

OTHER PUBLICATIONS

International Preliminary Report on Patentability from PCT Application No. PCT/EP2016/001366, dated Feb. 22, 2018.
International Search Report from PCT Application No. PCT/EP2016/001366, dated Nov. 16, 2016.

* cited by examiner

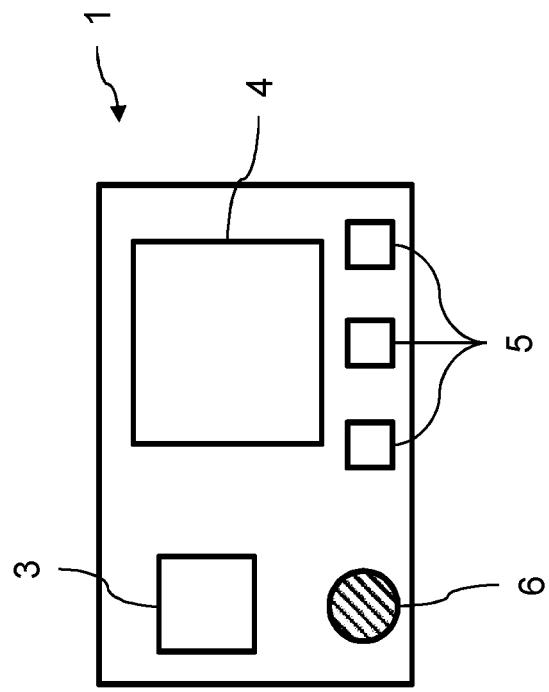
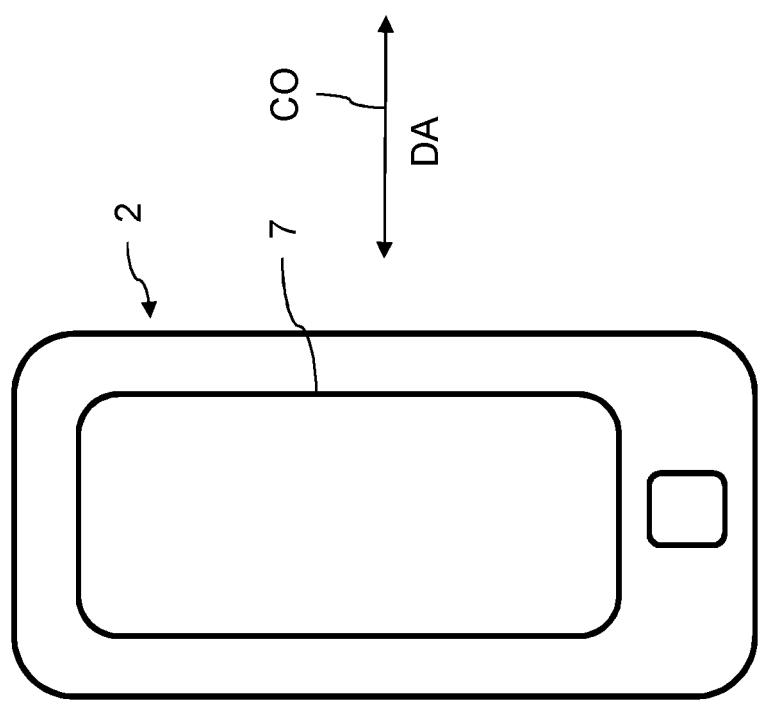

METHOD FOR INDIVIDUALIZING A PORTABLE DATA CARRIER, IN PARTICULAR A CHIP CARD

BACKGROUND

This invention relates to a method for individualizing a portable data carrier, in particular a chip card.

The functionalities of portable data carriers and in particular from chip cards (such as e.g. credit cards) are as a rule defined irrevocably upon the manufacture at the card manufacturer. A subsequent individualization of these cards by the user is therefore not possible. Specifically, chip cards cannot be adapted depending on specific user wishes in their optical appearance as well as in security-relevant functions, and there also does not exist the possibility to load subsequently updated data, such as updated software, onto the card.

In the print U.S. Pat. No. 7,628,322 B2 a method is shown for personalizing an end device in which personalization data are wirelessly transferred to the end device via a secure channel between the end device and a server. As a result of this, it becomes possible, for example to utilize the end device for payment operations similar to a credit card.

SUMMARY

Object of the invention is to make a simple and fast individualization of a portable data carrier and in particular a chip card possible.

In the method according to the invention, an end device supplies data for configuring and/or updating one or more functions of the portable data carrier to be individualized. Depending on embodiment, the end device can generate the data itself or have received the data also from another place, e.g. a server. Here, the term function is to be understood broadly. In particular, a function can also relate to the optical appearance of the portable data carrier. The end device is preferably a mobile end device, i.e. an end device which is portable and therefore can be carried by a user. Preferably the end device is a mobile telephone and/or a laptop and/or a tablet. Nevertheless, the end device can be, as the case may be, also a PC (PC=Personal Computer).

In the method according to the invention, the data which are supplied by the end device are transmitted by this to the portable data carrier via a communication connection between the end device and the portable data carrier. Finally, a configurating and/or updating of the function or functions of the portable data carrier is effectuated by means of the data transmitted to the portable data carrier.

The method according to the invention has the advantage that a portable data carrier can in a simple manner be personalized, individualized and/or initialized even subsequently after its manufacture by means of an end device. As a result of this, functions of the end device can be quickly and flexibly arranged or adapted.

As mentioned hereinabove, the method according to the invention is preferably utilized for individualizing a chip card, such as e.g. a smart card.

Here, the chip card or in general the portable data carrier can be provided for different purposes. In particular, the portable data carrier can be a card for carrying out monetary transactions (e.g. a credit card) and/or a card for booking tickets (e.g. in the public mass transit) and/or a card for the authorizing access of a user. Likewise, the portable data carrier can be a security element. Nevertheless, other applications for using the portable data carrier are also conceivable.

In a particularly preferred embodiment, the end device supplies the data to be transmitted on the basis of an input of a user in a user interface of the end device. Here, the input of the user is effected preferably via a display (e.g. a touch screen) and/or corresponding keys on the end device. By the inputting of the user, the data for configuring and/or updating the function or functions of the portable data carrier are specified. The user is therefore given the possibility to suitably adapt the portable data carrier to his or her wishes and ideas. Alternatively or additionally, the input of the user can initiate a downloading of the data from a server for configuring and/or updating the function or functions of the portable data carrier.

In a further variant of the method according to the invention, the supplied and transmitted data comprise information items which are displayed on a display of the portable data carrier. These information items can comprise e.g. one or more images, wherein the images can be e.g. individual images stemming from the user of the end device, whose transfer to the portable data carrier was prompted by the user. Alternatively, the images can be images which are supplied by the issuer of the data carrier, in particular it can be images on which a product or such is promoted.

The information items shown on the display of the portable data carrier can, as the case may be, also comprise textual information items, wherein the textual information items preferably are personal data of a user whom the portable data carrier is associated with. In case of a card with which monetary transactions can be carried out, this is the owner of the card who has a corresponding account with a credit institution. The personal data of the user can refer e.g. to the name of the user, so that upon a name change the new name can be made visible on the portable data carrier. Likewise, the personal data can be account information items of the user (e.g. an account number) in case of a card for monetary transactions, wherein the account information items displayed on the card can be changed with the method.

In a further preferred embodiment, the kind of output of at least one signal on the portable data carrier is defined by the supplied and transmitted data, wherein the output of the at least one signal is preferably coupled to a predetermined event. For example, an output of the at least one signal can be effected whenever a transaction was carried out through the portable data carrier, e.g. a contactless transaction.

In a preferred variant of the just described embodiment, the kind of the output of one or more acoustic signals which are generated over one or more loudspeakers on the portable data carrier is defined by the data. For example, a tone or a tone sequence and, as the case may be, also a song can be defined. Alternatively or additionally, the kind of the output of one or more optical signals which are generated by one or more optical elements, e.g. by one or more LEDs, on the portable data carrier can also be defined by the data. In particular, e.g. the sequence of the LEDs lighting up can be specified.

In a further particularly preferred embodiment, the supplied and transmitted data comprise updated software for an application on the portable data carrier and/or cryptographic information items, such as security credentials. Further, the data can stem from an issuer or manufacturer of the portable data carrier. In this manner it is e.g. made possible that an updated software is deposited by the manufacturer or issuer of the portable data carrier on the portable data carrier by means of the end device. In this case, the data supplied by the end device relate to the updated software which is downloaded from a corresponding server to the end device.

Different kinds of communication connections can be utilized for the data transfer between the end device and the portable data carrier. In a preferred variant, a wireless communication connection, e.g. based on Bluetooth or Bluetooth LE (LE=Low Energy), is utilized. Nevertheless, a wire-based or contact-type communication connection can also be employed, as the case may be, e.g. by attaching the portable data carrier to the end device by a cable or by inserting the portable data carrier in the end device and there connecting it to corresponding contacts.

Besides the above-described method, the invention relates to a system for individualizing a portable data carrier, in particular a chip card, comprising an end device as well as the portable data carrier to be individualized. In this system the end device is arranged to supply data for configuring and/or updating one or more functions of the portable data carrier and to transmit the data to the portable data carrier via a communication connection between the end device and the portable data carrier. Further, the portable data carrier is arranged to receive the transmitted data and to effectuate by means of these data a configurating and/or updating of the function or functions of the portable data end device. Preferably, this system is arranged for carrying out one or more preferred variants of the method according to the invention.

The invention furthermore relates to an end device for employment in the method according to the invention or one or more preferred variants of the method according to the invention. The end device is arranged to supply data for configuring and/or updating one or more functions of the portable data carrier and to transmit the data to the portable data carrier via a communication connection between the end device and the portable data carrier.

The invention furthermore relates to a portable data carrier for employment in the method according to the invention or one or more preferred variants of the method according to the invention. The portable data carrier is arranged to receive from an end device data for configuring and/or updating one or more functions of the portable data carrier via a communication connection between the end device and the portable data carrier and to effectuate by means of these data a configurating and/or updating of the function or functions of the portable data carrier.

BRIEF DESCRIPTION OF THE DRAWINGS

Embodiment examples of the invention will hereinafter be described in detail with the help of the attached FIG. 1. This FIGURE shows a schematic representation which illustrates the carrying out of a variant of the method according to the invention.

DETAILED DESCRIPTION OF VARIOUS EMBODIMENTS

Hereinafter, an embodiment of the invention is described with the help of a portable data carrier in the form of a chip card 1 as well as a mobile end device in the form of a smartphone 2. The chip card 1 comprises a microprocessor unit which is integrated in a chip 3 and with which, among other things, payment functionalities can be realized. For this, a corresponding software for such payment functionalities is deposited in the card. Besides a display 4, on which different information items can be rendered, the card 1 further comprises three LEDs 5 for outputting optical signals as well as a loudspeaker 6 for outputting acoustic signals.

The card further has a contactless interface via which a wireless communication with a corresponding interface of the telephone 2 can be established. The contactless interfaces of the chip card and the mobile telephone are not shown separately in FIG. 1. The wireless communication between chip card and telephone can be based e.g. on Bluetooth. However, another type of communication can also be used, such as e.g. NFC (NFC=Near Field Communication). In the scenario of FIG. 1, the wireless communication connection between the mobile telephone and the chip card is already established as is indicated by a double arrow CO. Via this communication connection, data DA from the mobile telephone are transferred to the chip card. The data DA serve for configurating or updating functions of the chip card as is to be explained more closely below.

The mobile telephone 2 has a user interface which comprises a touch display 7 via which a user can make inputs in the mobile telephone. In the embodiment described herein, a specific application or app is deposited on the mobile telephone which the user can call up via the display 7 and which makes a subsequent individualization or personalization of the chip card 1 possible upon established communication connection CO. Here, the user can define certain functionalities of the card via inputs on the display 7. The data corresponding to the defined functionalities will then be transferred to the chip card via communication connection CO. Further, the user or another person can prompt via an input in the display 7 the updating of data (e.g. software) on the chip card, wherein for this purpose the software or the data are transferred from a server to the mobile telephone which thereupon transmits the software or the data via the communication connection CO to the chip card 1.

Hereinafter, different variants of the individualization of the chip card 1 are described, wherein, as the case may be, only a part of these variants can be used. According to a first variant, the user can display subsequently personalized information items on the display 4 of the chip card 1 with the corresponding app on the mobile telephone 2. The personalized information items which are specified by the user via the display 7 of the telephone 2 can be e.g. personal images which he or she has stored on his or her mobile telephone. Likewise the information items can relate to e.g. a name change of the user or a change of the account of the user. In this case the updated name or the updated account are displayed on the display 4 of the chip card 1.

In a second variant, the user can define a tone or a tone sequence via the app on the mobile telephone 2 and, as the case may be, also a song which e.g. upon a transaction is output over the loudspeaker 6 of the chip card 1. In a third variant, there also exists the possibility that the lighting up the LEDs 5 and in particular the sequence of the lighting up LEDs on the chip card 1 is configured by the user. The lighting up of the LEDs can in turn be prompted upon carrying out a transaction.

According to a fourth variant, which was already mentioned above, the updating of software or other kind of data which stem from a further entity on the chip card can be also prompted by the user. Here, specifically the issuer and/or manufacturer of the chip card has the possibility to subsequently individualize the card by means of software updates or to updated adjustments or security credentials.

The further entity can be e.g. a credit institution or a bank. In this case the updated data or the updated software are loaded from a server associated with the credit institution to the mobile telephone 2 which thereupon transmits these data via the communication connection CO to the chip card 1. The updated data can, for example, also be information items represented in the display of the card, such as e.g. account information items of the card owner or, as the case may be, also advertising information items for the card owner. In a further variant, a fixed region of the display can be reserved for information items of the further entity, whereas the other region of the display is available directly for information items specified by the card owner.

The hereinabove described embodiments of the invention have a number of advantages. In particular, an individualization of a portable data carrier can be attained in a simple manner by means of information items which stem directly from the user of an end device or, as the case may be, a third entity, such as e.g. the issuer or manufacturer of the portable data carrier. By the individualization of the portable data carrier, its utilization increases by which the acceptance of the portable data carrier with the user is improved.

The invention claimed is:

1. A method for individualizing a portable data carrier, in which an end device supplies data for configuring and/or updating one or more functions of the portable data carrier;
the data are transmitted by the end device to the portable data carrier via a communication connection between the end device and the portable data carrier;
a configuring and/or updating of the function or functions of the portable data carrier is effectuated by means of the data transmitted to the portable data carrier;
wherein the data comprise information items which are displayed on a display of the portable data carrier.

2. The method according to claim 1, wherein the end device is a mobile telephone, a laptop, or a tablet.

3. The method according to claim 1, wherein the portable data carrier is a card for carrying out monetary transactions, a card for booking tickets, a card for authorizing access of a user, or a security element.

4. The method according to claim 1, wherein the end device supplies the data on the basis on an input of a user in a user interface of the end device,
wherein the input of the user specifies the data for configuring and/or updating the function or functions of the portable data carrier and/or initiates a downloading of the data from a server for configuring and/or updating the function or functions of the portable data carrier.

5. The method according to claim 1, wherein the information items comprise one or more images.

6. The method according to claim 1, wherein the information items comprise textual information items, wherein the textual information items are preferably personal data of a user whom the portable data carrier is associated with.

7. The method according to claim 1, wherein the kind of the output of at least one signal on the portable data carrier is defined by the data, wherein the output of the at least one signal is preferably coupled to a predetermined event.

8. The method according to claim 7, wherein by the data the kind of the output of one or more acoustic signals is defined which are generated via one or more loudspeakers on the portable data carrier, and/or that through the data the kind of the output of one or more optical signals is defined which are generated via one or more optical elements on the portable data carrier.

9. The method according to claim 1, wherein the data comprise an updated software for an application on the portable data carrier and/or cryptographic information items and/or that the data stem from an issuer or manufacturer of the portable data carrier.

10. The method according to claim 1, wherein the communication connection between the end device and the portable data carrier comprises a wireless communication connection and/or a wire-based communication connection.

11. A system for individualizing a portable data carrier, in particular of a chip card, comprising an end device and the portable data carrier, wherein
the end device is arranged to supply data for configuring and/or updating one or more functions of the portable data carrier and to transmit the data to the portable data carrier via a communication connection between the end device and the portable data carrier;
the portable data carrier is arranged to receive the transmitted data and to effectuate by means of these data a configuring and/or updating of the function or functions of the portable data carrier,
wherein the data comprise information items which are displayed on a display of the portable data carrier.

12. An end device for employment in a method according to claim 1, wherein the end device is arranged to supply data for configuring and/or updating one or more functions of the portable data carrier and to transmit the data to the portable data carrier via a communication connection between the end device and the portable data carrier.

13. A portable data carrier for the employment in a method according to claim 1, wherein the portable data carrier is arranged to receive from an end device data for configuring and/or updating one or more functions of the portable data carrier via a communication connection between the end device and the portable data carrier and to effectuate by means of these data a configurating and/or updating of the function or functions of the portable data carrier.

* * * * *